(12) United States Patent
Poli et al.

(10) Patent No.: US 12,337,503 B2
(45) Date of Patent: Jun. 24, 2025

(54) METHOD FOR MANUFACTURING CLADDING ELEMENTS FOR USE IN CONSTRUCTION

(71) Applicant: POLITECNICO DI MILANO, Milan (IT)

(72) Inventors: Tiziana Poli, Milan (IT); Andrea Zani, Dublin, CA (US); Alberto Speroni, Milan (IT); Andrea Giovanni Mainini, Milan (IT)

(73) Assignee: POLITECNICO DI MILANO, Milan (IT)

( * ) Notice: Subject to any disclaimer, the term of this patent is extended or adjusted under 35 U.S.C. 154(b) by 711 days.

(21) Appl. No.: 17/601,210

(22) PCT Filed: Apr. 6, 2020

(86) PCT No.: PCT/IB2020/053260
§ 371 (c)(1),
(2) Date: Oct. 4, 2021

(87) PCT Pub. No.: WO2020/202122
PCT Pub. Date: Oct. 8, 2020

(65) Prior Publication Data
US 2022/0176589 A1  Jun. 9, 2022

(30) Foreign Application Priority Data
Apr. 5, 2019  (IT) .......... 102019000005300

(51) Int. Cl.
*B28B 19/00* (2006.01)
*B28B 11/00* (2006.01)
(Continued)

(52) U.S. Cl.
CPC ........ *B28B 19/0092* (2013.01); *B28B 11/003* (2013.01); *B28B 23/0006* (2013.01);
(Continued)

(58) Field of Classification Search
CPC ............. B28B 19/0092; B28B 23/0006
See application file for complete search history.

(56) References Cited

U.S. PATENT DOCUMENTS 8,287,982 B2  10/2012  Brewin et al.
2005/0242462 A1  11/2005  Symons
(Continued)

FOREIGN PATENT DOCUMENTS

CA  2 060 060 A1  8/1992
CN  106316177 A  *  1/2017
GB  1 429 167 A  3/1976

OTHER PUBLICATIONS

Wu, X., Three Dimensional Spacer Fabric, Jan. 11, 2017, machine translation of CN 106316177 (Year: 2017).*
International Search Report and Written Opinion issued on Jul. 17, 2020 in corresponding International Application No. PCT/IB2020/053260; 11 pages.

*Primary Examiner* — Edmund H Lee
(74) *Attorney, Agent, or Firm* — Maier & Maier, PLLC (57) ABSTRACT

A method for manufacturing cladding elements for use in construction, including a composite cement-based structure, including an elastically deformable support element having a first surface, a second surface and a plurality of spacer elements having an elongated shape positioned between the first and second surface to realize a plurality of interconnected cavities. The method further provides preparing a substantially fluid and water-based cementitious composition and introducing the substantially fluid cementitious composition into the support element to obtain a composite structure in a deformable state. After this, part of the fluid cementitious composition is removed from the support element, to eliminate the excess fluid cementitious composition and position the deformable composite structure in a forming device. The method provides for maintaining the deformable composite structure in association with the
(Continued)

forming device, until the consolidation thereof and that said support element is constituted by a three-dimensional elastically deformable fabric.

5 Claims, 5 Drawing Sheets

(51) Int. Cl.
*B28B 23/00* (2006.01)
*B32B 5/02* (2006.01)
*B32B 13/14* (2006.01)
*E04C 2/04* (2006.01)
*E04F 13/14* (2006.01)
*B32B 3/26* (2006.01)

(52) U.S. Cl.
CPC .............. *B32B 5/028* (2013.01); *B32B 13/14* (2013.01); *E04C 2/044* (2013.01); *E04F 13/14* (2013.01); *B32B 3/266* (2013.01)

(56) References Cited

U.S. PATENT DOCUMENTS

| | | |
|---|---|---|
| 2011/0185660 A1 | 8/2011 | Roye |
| 2012/0148806 A1* | 6/2012 | Dubey ................ B28B 19/0092 428/193 |
| 2019/0071837 A1 | 3/2019 | Krasnoff |

* cited by examiner

METHOD FOR MANUFACTURING CLADDING ELEMENTS FOR USE IN CONSTRUCTION

TECHNICAL FIELD

The present invention relates to the sector of accessory structures for use in construction. In particular, the invention relates to a method for manufacturing a cladding element comprising a composite cement-based structure, for use in construction.

BACKGROUND

To date, in the construction sector there has been reduced availability of elements or structures that can be used for easily and economically manufacturing cladding having complex shapes, e.g. characterized by single or double curved geometries, multiple depressions, folds, holes, etc.

A solution adopted in the sector is that of manufacturing formworks that reproduce the desired shape. A cement-based mixture is poured into them, which is left for the necessary time for the consolidation thereof. Following the consolidation of the material, the formwork is removed and the structure thus realized can be used as a cladding or, possibly, be subjected to surface treatment processes before the use thereof.

The main limitation of this solution is the need to have available formworks that are difficult to manufacture and have a considerable production cost, particularly when elements are to be manufactured that have different configurations from one another, both due to the methodology used, and the cost of machinery.

As well as the formworks, structures are also known that use specific supports adapted to contain a cement-based material which, once the consolidation process had finished, allows self-supporting structural elements to be obtained. Such elements are generally provided with considerable rigidity and hardness and are therefore generally used as protection and/or reinforcement elements for manufacturing civil and industrial infrastructures.

In such context, U.S. Pat. No. 8,287,982 describes a process for the manufacturing of structures for use in construction through a fabric that is impregnated by a mixture obtained by mixing a powder material, provided in the fabric, with a liquid introduced in a second step. The fabric used comprises a bottom layer made with narrow meshes, a top layer made with wider meshes, filiform elements that extend through the space between the bottom layer and the top layer. The powder material, for example cement, is present between said layers and is subsequently activated through the addition of water. Once the hardening has been achieved by drying, the product obtained can be used for different applications such as for forming covers, tracks for vehicles or pedestrians, formworks for casting concrete, barriers, banks, floors, or for manufacturing elements for repairing structures such as roofs or pipes.

However, this solution also has some limits. First of all, it does not allow the realization of particularly complex geometries as the particular weft of the fabric that is to hold the powder material does not make it particularly extensible. Furthermore, the process for manufacturing the final product requires the uniform distribution of the powder material inside the fabric, to prevent the creation of non-uniformity in the final structure which could compromise the desired mechanical resistance characteristics of the product obtained. Such characteristics therefore hinder the possibility to model the assembly formed by fabric and material in the fluid state and to obtain complex shaped structures. Furthermore, the structures made using such process, are characterized by a much dense weft, therefore they do not have translucent and/or transparent characteristics.

Additionally, the presence of powder material within the fabric, implies particular care must be taken in the packaging of the fabric itself, both during storage and transport, to prevent the loss of any of this material from the fabric and/or the deterioration thereof due to environmental factors such as damp, solar radiation and temperature changes. Finally, such solution requires a particular type of fabric, in which the surfaces must be dissimilar at least in terms of geometry and permeability characteristics. The sum of such features leads to an increase in costs for the management of the process and the material used.

Document CA 2060060 describes a method and apparatus for producing planar shaped panels comprising a cementitious core wound in a reinforcement and covering layer, impregnated with a cement-based mixture and joined to the core so as to cover it entirely.

Document US 2005242462 describes a method for producing a product, such as a panel or the like for use in construction, starting from a flexible open-cell polymer foam element and a suspension of hydraulic binder.

Document GB1429167 describes a fibre-reinforced composite and a process for the manufacturing thereof, which comprises a cementitious matrix material into which absorbent fibres and reinforcement fibres are incorporated.

SUMMARY

The object of the present invention is to overcome the drawbacks of the prior art.

In particular, the object of the present invention is to provide a method for the manufacturing of cladding elements for use in construction, which allows to simply and economically manufacture elements with complex shapes.

A further object of the present invention is to provide a method for manufacturing cladding elements that allows to obtain elements provided with variable translucent and/or transparent properties until a partially or totally opaque element.

Furthermore, the object of the present invention is that of presenting a method for manufacturing cladding elements, which allows easy design and efficient and quick manufacturing thereof.

Finally, the purpose of the present invention is that of manufacturing a cladding element for use in construction that is both light and provided with improved versatility of use.

These and other objects of the present invention are achieved by a method and a device incorporating the features of the accompanying claims, which form an integral part of the present description.

The present invention relates to a method for manufacturing cladding elements for use in construction, comprising a composite cement-based structure. The method envisages providing an elastically deformable support element, comprising a first surface, a second surface and a plurality of spacer elements having an elongated shape positioned between said first and second surface so as to realize a plurality of interconnected cavities. The method then envisages preparing a substantially fluid and water-based cementitious composition and introducing said substantially fluid cementitious composition into the support element so as to obtain a deformable composite structure. The method then envisages removing part of the substantially fluid cementitious composition from the support element so as to remove the excess fluid cementitious composition. The method further envisages positioning such deformable composite structure in a forming device and maintaining such composite structure in association with the forming device, until solidification thereof. According to the method, the support element is constituted by a three-dimensional elastically deformable fabric and the cementitious composition comprises at least one fluidifying and/or plasticizing additive and in which cement, additive and water are present according to a weight ratio variable from 1; 1/3; 1/3 to 1; 1/6; 1/6.

Such solution enables to realize self-supporting cladding elements, which are versatile for a wide range of possible applications in the construction sector. The method according to the invention further enables a consistent reduction of the weight of the composite cement-based structures realized to be obtained, as both the quantity and distribution of the cementitious composition inside the support element can be optimized; in this way, cladding elements can be realized with variable light and translucent and/or transparent properties until obtaining a partially or totally opaque element. Furthermore, the preparation of the cement-based composition in a step prior to the introduction thereof into the support element, implies the advantage of realizing an accurate mixture and therefore an improved quality cementitious composition in the liquid state. According to such method the number of components and materials used for the realization thereof is reduced, therefore simplifying both the design and the manufacturing processes. The realization of the cladding elements can be further advantageously performed with reduced time frames and contained costs, also in proximity to the place of application thereof.

According to a different aspect, the invention relates to a cladding element for use in construction comprising at least one elastically deformable support element, comprising a first surface and a second surface, a plurality of spacer elements positioned between said first and second surface and connected thereto. The spacer elements have an elongated shape and are arranged so as to form a plurality of interconnected cavities inside which a water-based cementitious composition is placed which comprises at least one fluidifying and/or plasticizing additive and in which cement, additive and water are present according to a weight ratio variable from 1; 1/3; 1/3 to 1; 1/6; 1/6. The support element is constituted by a three-dimensional elastically deformable fabric.

Such solution enables to provide a light and translucent cladding element having improved versatility of use, i.e. it can be easily configured. The particular composition of the cementitious mixture together with the related support element further enables a light cladding element to be obtained and the costs of the materials that are used in the manufacturing thereof to be contained.

The presence of interconnected cavities advantageously enables the spread of the cementitious composition in the fluid state introduced into the support element, allowing to obtain a uniform distribution thereof into the cavities.

The present invention in at least one of the aforesaid aspects may have at least one of the following preferred features, taken individually or in combination with any other one of the preferred characteristics described.

Preferably, the method provides to removing the consolidated composite structure from the forming device.

In an embodiment, the method further provides to s removing the composite structure from the forming device during the consolidation step.

In an embodiment, the maintenance of the composite structure in the forming device comprises moving the forming device so as to obtain a predetermined configuration of the composite structure itself.

In this way it is possible to realize cladding elements according to various geometries, from the simplest shapes that envisage planar surfaces, to the more articulated ones, having a single or double curvature, to the possibility of realizing complex surfaces.

Preferably, said maintenance of the composite structure in association with the forming device is performed for a predetermined time interval $\Delta t$.

Preferably, the removal of part of the fluid cementitious composition from the support element is accomplished by localized operations, by means of a jet of fluid incident on the first surface and/or on the second surface of the support element, during the step of association with the forming device.

In this way, by regulating the distribution of the cementitious composition, it is possible to control the translucence and/or transparency of the cladding element obtained.

In an embodiment, at least one of said first surface and second surface is permeable.

This advantageously allows an easy passage of the cementitious composition towards the inside of the support element, during the introduction step thereof, as well as the selection of the introduction methods as a function of the specific characteristics of the materials used and the environmental conditions.

Preferably, both the first surface 4 and the second surface 5 of the support element 2 are permeable.

In this way it is possible to use the support element according to any orientation, during the step of introducing the cementitious composition therein.

Preferably said first surface is positioned with respect to said second surface at a variable distance between 1 mm and 30 mm. Preferably the first surface is positioned with respect to the second surface at a variable distance between 1 mm and 20 mm. Even more preferably at a distance between 3 mm and 7 mm.

In a preferred embodiment, the cladding element comprises at least one opening, made by means of cutting and/or boring.

In this way, cladding elements can be realized, which are permeable to solar radiation and/or air and/or water and adaptable to various uses such as shading systems, sun screens, exterior insulation systems, partition walls, architectural elements.

Further features and advantages of the present invention will be more apparent from the description of the accompanying drawings.

BRIEF DESCRIPTION OF THE DRAWINGS

The invention will be described below with reference to some examples, provided for explanatory and non-limiting purposes, and illustrated in the accompanying drawings. These drawings illustrate different aspects and embodiments of the present invention and, where appropriate, reference numerals illustrating similar structures, components, materials and/or elements in different figures are indicated by similar reference numbers.

FIG. 3b is a front schematic view of the support element of FIG. 3a;

FIG. 5a is a schematic sectional view of the cladding element comprising a composite structure of FIG. 5a; and FIG. 5c is a front schematic view of the cladding element of FIG. 5a;

DETAILED DESCRIPTION OF THE EMBODIMENTS

While the invention is susceptible to various modifications and alternative constructions, certain preferred embodiments are shown in the drawings and are described hereinbelow in detail. It is in any case to be noted that there is no intention to limit the invention to the specific embodiment illustrated, rather on the contrary, the invention intends covering all the modifications, alternative and equivalent constructions that fall within the scope of the invention as defined in the claims.

The use of "for example", "etc.", "or" indicates non-exclusive alternatives without limitation, unless otherwise indicated. The use of "includes" means "includes, but not limited to" unless otherwise stated.

With reference to the cited figures, 100 indicates overall a cladding element, realized according to the present invention. The cladding element 100 comprises a composite structure 1 that includes a support element 2 and a cementitious composition 3, placed within such support element 2.

The support element 2 comprises a first surface 4 and a second surface 5, which define a volume within which spacer elements 6 are arranged, connected both to the first surface 4 and to the second surface 5, and apt to keep them separate from one another.

The spacer elements 6 preferably have an elongated shape and are arranged so as to form a plurality of cavities 7 within said volume. Such elements 6 can further be arranged orthogonally with respect to the first and second surface, or according to an angle of incidence different from 90° as a function of the properties (e.g. mechanical resistance and/or deformability) that the support element must have for the specific application. Said spacer elements 6 allow the surfaces 4 and 5 of the support element 2 to be kept distanced, also following slight compressive stresses, while guaranteeing the deformability characteristics thereof. Preferably the support element has a compressive strength of greater than about 4 kPa and less than about 20 kPa.

In particular, the first and second surface 4, 5 of the support element 2 are constituted by a weft and a warp so as to be able to obtain, by appropriately changing their weave, different geometries for each of the flat surfaces, and determine different void-to-solid ratio levels and advantageously allow the transparency and mechanical properties of the support element 2 to be varied as preferred, on the basis of the specific application needs of the cladding element realized therewith. Preferably said first surface 4 and said second surface 5 are of the textile type.

In a preferred solution the support element 2 is constituted by an extensible three-dimensional elastically deformable fabric, thanks to the characteristics of the weaving process apt to realize the structure identified above and/or for the use of an elasticized type yarn.

An example of three-dimensional fabric can be obtained with polyethylene terephthalate (PET) or polyester (PL).

Preferably, the two outer surfaces of the three-dimensional fabric are connected by means of an internal connection layer, comprising an alternation of yarns interwoven with both surfaces.

Preferably, the spacer elements are made of yarn which is woven so as to be interwoven with the first and the second surface 4, 5. The yarn used to form the surfaces 4, 5 of the support element 2 may be of the same type or different according to the particular properties that are to be conferred to the first and the second surface 4, 5.

The three-dimensional fabric used for realizing the cladding element 100 is resistant to tearing and abrasion and has a structure that enables it to be elongated on the plane and to recover its original shape after compressive or tensile stress actions, i.e. that gives it elastic deformability property. Such type of support element is light, resistant to compression and permeable to air. In particular, the permeability to air is guaranteed by the realization of inter-connected empty volumes, which are realized between the two spacing elements that separate the two outer faces. According to such structure, it is therefore possible to advantageously simply and economically realize a light cladding element with a complex shape.

In a preferred embodiment the first surface 4 and the second surface 5 are substantially planar and are kept separate from one another by the spacer elements 6 according to a substantially constant distance for the entire extension thereof.

In an alternative embodiment, the spacer elements 6 are configured so as to keep the first surface 4 separate from the second surface 5 according to a distance that can vary along the extension of the surfaces themselves.

The first surface 4 and the second surface 5 can also be realized according to any weft, based on the model and desired finish as well as the elasticity requirements and the required opening factor, or void-to-solid ratio.

Advantageously, a further finishing layer can be applied to the surfaces of the cladding element 100 obtained, e.g. one or more layers of gypsum and/or plaster, as the porosity of the surfaces themselves allows excellent adhesion to different materials to be obtained.

According to the method for manufacturing cladding elements according to the present invention, the elastically deformable support element 2 is provided and a preferably water-based cementitious composition 3 is prepared.

Preferably, the cementitious composition 3 comprises a fluidifying and/or plasticizing additive. In a preferred embodiment the cementitious composition 3 comprises cement, additive and water in a ratio by weight that can vary from 1; 1/3; 1/3 to 1; 1/6; 1/6, according to the porosity of the material that composes the support element 2, the density thereof, and factors such as temperature and environmental humidity. This means that the cementitious composition is realized so as to comprise cement, water and additive in a variable quantity so that, for every 100 kg of cement, the quantity of water used is variable in an interval from 16.7 litres to 33.3 litres (where it is considered that one litre of water has substantially a weight equal to 1 kg) and the quantity of additive is variable in an interval from 16.7 kg to 33.3 kg.

In a preferred embodiment of the present invention the cement used for realizing the cementitious composition 3 is sulfoaluminate cement. The cement used can also be selected from photocatalytic cement, Portland cement, or other types provided with characteristics suitable for the use envisaged by the invention.

The presence of a fluidifying additive enables the workability of the cementitious composition 3 to be increased and the elasticity of the compound once hydrated, in order to improve the resistance thereof on fragile cracks. In a preferred embodiment the additive is constituted by latex; further possible embodiments envisage the use of super fluidifying substances and/or set retardants and/or aerating agents, on the basis of specific needs.

The cementitious composition 3 is then introduced in the substantially fluid state into the support element 2 so as to obtain a composite structure 1 which, in this step, is flexible and deformable.

The support element 2 has at least one permeable surface, in order to enable the passage of the cementitious composition 3 in the fluid state towards the internal volume of the support element 2. In a preferred embodiment the cementitious composition 3 in the fluid state is deposited on a surface of the support element 2 and left to permeate through it by gravity or with the contribution of a vibrating plane (not illustrated in the drawings), connected to the support element 2.

In a preferred variant both the first surface 4 and the second surface 5 of the support element 2 are permeable, allowing further introduction methods of the cementitious composition 3 into the structure of the support element 2. According to such conformation of the support element it is for example possible to wet it by immersion soaking or by spreading the cementitious composition 3 onto one or both of the surfaces of the support element 2.

Following the introduction of the cementitious composition 3 into the structure of the support element 2, the fluid cementitious composition 3 is removed in a controlled and partial way from the support element, so as to remove any excess fluid cementitious composition. The action of removing part of the cementitious composition can for example be performed by means of the controlled wringing of the deformable material being processed.

In this way, also thanks to the geometry of the internal structure of the support element that enables the cementitious composition in the liquid state present therein to be withheld, any leaks of liquid, in the subsequent processing steps are hindered. Furthermore, such method makes it possible already in this processing step to realize a predetermined non-uniform distribution of the cementitious composition inside the support element 2, so as to obtain zones having differentiated transparent and/or translucent properties, alternating or not with opaque zones.

The support element 2 preferably has the spacer elements 6 arranged so as to realize a plurality of interconnected cavities 7. This promotes the spread of the cementitious composition 3 in the fluid state, into the composite structure 1, allowing a uniform distribution thereof within the cavities 7 to be obtained.

Figure 7:
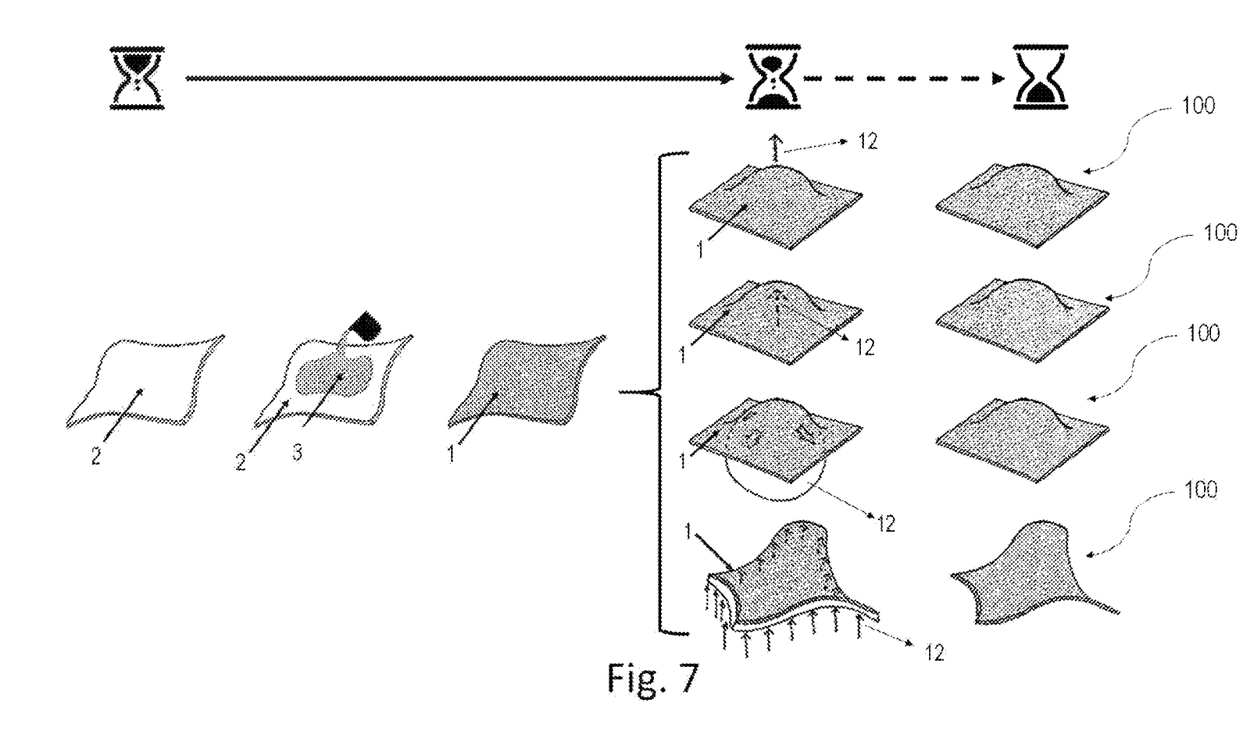
FIG. 7 is a representation of different possible working and forming steps of the method according to the invention, particularly relating to the conformation assumed by the cladding element.

The composite structure 1 thus obtained is then inserted into a continuous or discontinuous forming device (not shown in the figures), and configured to determine a desired final shape. For that purpose, as a function of a predetermined shape in the design phase, as shown for example in FIG. 7, the forming device can be moved so as to subject the composite structure 1 formed by the support element 2 together with the cementitious composition 3, to a localized or widespread mechanical stress action 12. In this way, the composite structure can be subject to tensile and/or compressive stress according to one or more directions, until obtaining the desired conformation. Such movement of the forming device can be performed manually or automatically.

The final conformation of the element, obtained downstream of such stress, depends on a plurality of factors, such as: the position and number of any constraints (not shown in the figures) placed along the perimeter of the composite structure 1, the number of points on which stress is exerted, the shape of the devices adapted for the stress, and the initial shape of the support element.

The stress mentioned above can advantageously also take place through localized compressive or tensile action on the three-dimensional fabric that constitutes the support element 2.

Furthermore, according to a preferred embodiment, in this step cuts and/or openings are made in the fabric constituting the support element; advantageously, the extension of such cuts can be absorbed by the elasticity of the fabric or amplified by the stress actions on the fabric itself.

In a possible embodiment, such forming device is constituted by an adjustable frame. In a different embodiment, the forming device is constituted by a mould. In a further embodiment, the forming device is constituted by a resting perimeter element and/or an appropriately shaped rigid and/or deformable constraining element.

The composite structure 1 is maintained in association with the forming device until the consolidation of the cementitious composition 3.

In a preferred embodiment the composite structure 1 is removed from the forming device after being consolidated, obtaining the desired cladding element 100.

In an alternative embodiment, in which the forming device is constituted by a frame, it is possible to maintain the composite structure 1 in association with the frame itself. According to such modality, it is possible to arrange cladding elements that have an additional reinforcement element to improve the mechanical resistance characteristics; the cladding elements thus obtained can further be coupled to other similar elements, by means of the frame or parts thereof, for realizing complex structures.

According to a preferred embodiment the composite structure 1 is kept in association with the forming device for an interval of time Δt, predetermined during the design step as a function of the process variables, and the geometry of the final cladding element 100 to be realized.

Such time interval can be determined during the design phase of the cladding element, on the basis of the specific dimensional and geometric characteristics thereof.

Further parameters that affect the time required for the hardening of the composite structure, and which are kept in consideration during the design phase, are for example the ambient temperature, the degree of humidity, any solar radiation incident on the surfaces and localized sources of heat.

In preferred forms of the invention, it is possible to define and realize zones of the cladding element 100 that are partially free from cementitious composition 3, so as to obtain a permeability of the light and/or air and/or water passage surface for the use of the cladding element 100 for example as a shading sun screening system, exterior insulation systems, partitions and architectural elements.

This can be realized, as mentioned, during the step of removing the cementitious composition 3 in the fluid state from the support element 2 or during the step of introducing the cementitious composition 3, by the differentiated pouring of material into zones. Furthermore, during the step of maintaining the composite structure 3 in association with the forming device, it is possible to appropriately move the latter so as to realize non-uniformity in the concentration of cementitious composition in suitable zones, previously identified during the design phase. Finally, it is possible to remove part of the cementitious composition 3 present in the liquid state in the support element 2, by means of localized operations such as using a spatula or the removal of material by means of a jet of fluid 10 incident on the surfaces of the support element 2.

By regulating the quantity and distribution of the cementitious composition 3 it is possible to control the translucency and/or transparency of the cladding element 100; the translucency and/or transparency value can also be designed as a function of the geometry of the support element 2.

In a further preferred embodiment, the method comprises realizing an interruption to the continuity of the composite structure 1 by means of openings 8, during the step of association with the forming device, and before the consolidation thereof is performed. Such openings 8 can be realized according to various geometries according to cuts and/or holes, in various possible sizes, maintaining the structural integrity of the cladding element 100. The resulting extent of the holes or cuts can therefore be managed through a localized modification to the compressive or tensile actions possibly applied to the fabric during the forming step. A localized increase in tensile actions along the surface of the fabric previously cut, contributes to the separation of the cutting flaps thereof. A reduction in such localized tensile actions reduces the extent thereof. Such operation can be actuated both prior to the introduction of the mixture and after it and prior to the hardening step. Both actions contribute to the modification of the final shape of the product.

Figure 1:
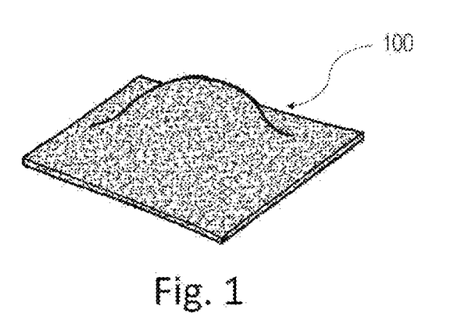
FIG. 1 is a perspective schematic view of a cladding element comprising a composite structure, according to an embodiment of the present invention.
Figure 2:
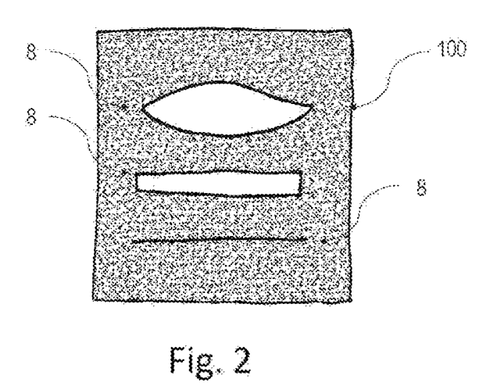
FIG. 2 is a perspective schematic view of a cladding element in a second embodiment of the present invention.
Figure 3A:
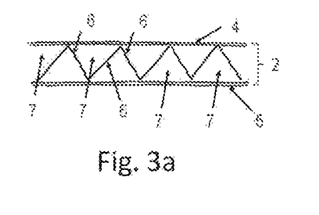
FIG. 3a is a schematic lateral section view of a support element being part of the composite structure, according to an embodiment of the present invention.
Figure 3B:
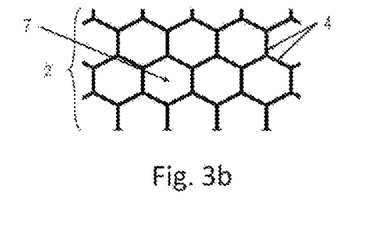
Figure 3C:
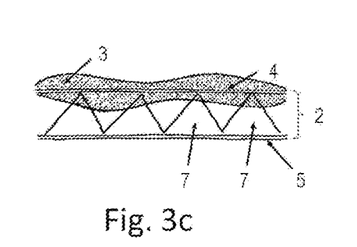
FIG. 3c shows a schematic and lateral view of the support element of FIG. 3a, during a step of the method according to the present invention.
Figure 3D:
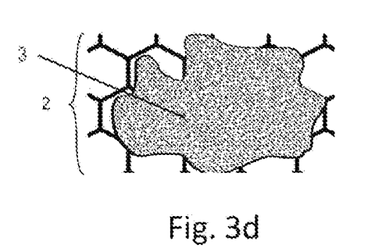
FIG. 3d shows a schematic and front view of the support element of FIG. 3b, during a step of the method according to the present invention.
Figure 3E:
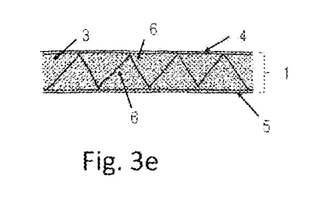
FIG. 3e shows a schematic and lateral view of the support element of FIG. 3a, during a further step of the method according to the present invention, subsequent to the step exemplified in FIG. 3c.
Figure 3F:
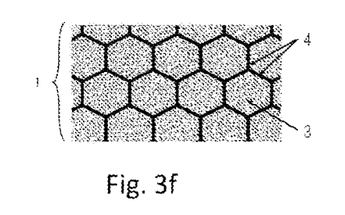
FIG. 3f shows a schematic and front view of the support element of FIG. 3b, during a step of the method according to the present invention subsequent to the step exemplified in FIG. 3d.
Figures 4A, 4B:
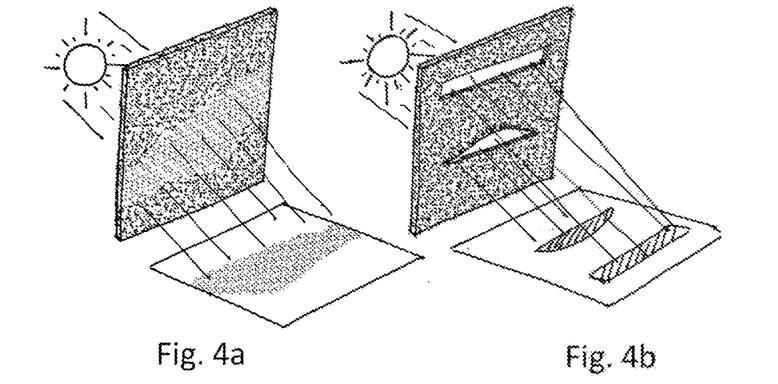
FIGS. 4a and 4b show a schematic and perspective view of the interaction between solar radiation and a cladding element according to the invention, in possible respective embodiments.
Figure 5A:
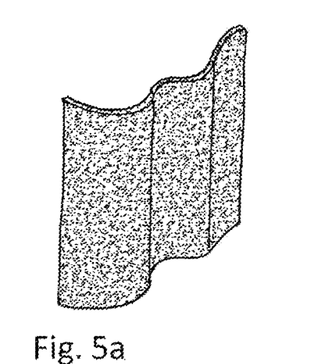
FIG. 5a is a perspective schematic view of a cladding element comprising a composite structure, according to a further embodiment of the present invention.
Figure 5B:
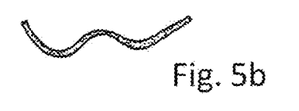
Figure 5C:
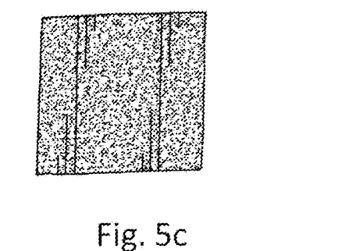
Figure 6A:
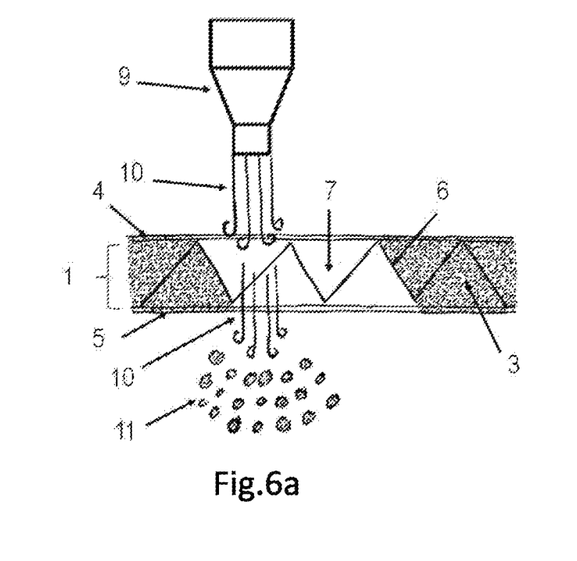
FIG. 6a is a schematic lateral view of a possible step of the method according to the invention.
Figure 6B:
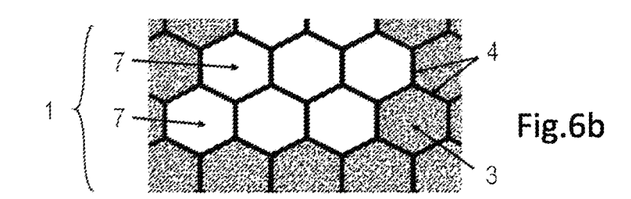
FIGS. 6b, 6c and 6d show a schematic front view of a portion of the support element, followed by the step exemplified in FIG. 6a, in different possible embodiments.
Figure 6C:
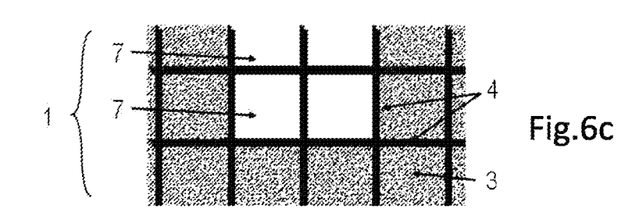
Figure 6D:
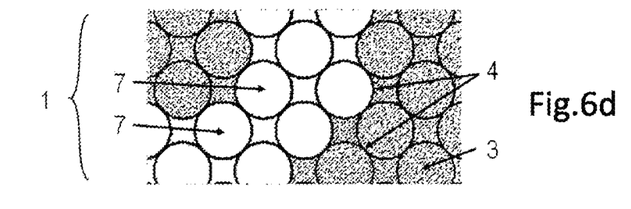

In a further preferred embodiment, the discontinuous perforation of the material can be obtained following the step of introducing the mixture into the three-dimensional fabric/support element and prior to the hardening step. In such step, a localized and discontinuous transparency can for example be advantageously obtained by means of a jet of fluid 10 emitted by a nozzle 9 so as to hit one or more surfaces 4, 5 of the support element 2 (see FIG. 6a), which advantageously allows a portion of cementitious composition in the fluid state 11 to be selectively removed. Such embodiment therefore enables the localized and selective emptying of the interconnected cavities of the spacer element, previously filled with cementitious fluid. Thus the localized emptying is performed at the space between the warp and weft. Such removal, which does not take place on the whole surface of the support element, enables semi-transparent portions to be realized with random, widespread or pre-determined patterns with a pixelation effect characterized by the geometry and characteristic of warp and weft.

Additionally, at the end of the manufacturing process, the surface of the cladding element 100 can be subjected to appropriate surface treatments adapted to improve the aesthetic effect and/or to obtain specific surface characteristics. Such treatments can for example be smoothing or plastering operations.

According to the method of the invention, it is possible to realize cladding elements 100 according to planar surfaces, with a single or double curvature, achieving complex surfaces with or without the presence of openings 8.

The cladding elements 100 realized according to the present invention, are self-supporting but not structural. The thicknesses that can be obtained are greater than 1 mm and less than 30 mm. In a preferred embodiment the thickness of the cladding element 100 has a variable value between 2 mm and 20 mm; even more preferably between 3 mm and 7 mm.

The invention thus conceived is susceptible to several modifications and variations, all falling within the scope of protection defined by the appended claims.

Moreover, all the details can be replaced by other technically equivalent elements. In practice, the materials used, as well as the contingent shapes and sizes, can be whatever according to the specific implementation requirements without for this reason departing from the scope of protection of the following claims.

The invention claimed is:

1. A method for manufacturing cladding elements for use in construction comprising a composite cement-based structure, said method comprising:
   providing an elastically deformable support element, comprising a first surface and a second surface defining a volume within which a plurality of spacer elements, having an elongated shape, connects the first and second surface and are arranged so as to realize a plurality of interconnected cavities within said volume;
   preparing a substantially fluid water-based cementitious composition;
   introduce said substantially fluid cementitious composition into the support element so as to obtain a deformable composite structure in a deformable state;
   removing part of the fluid cementitious composition from the support element, to remove the excess fluid cementitious composition;
   positioning said deformable composite structure in a forming device;
   maintaining said deformable composite structure in association with the forming device, until solidification of thereof; wherein
   said support element is constituted by a three-dimensional elastically deformable fabric; and wherein
   said cementitious composition comprises at least one fluidifying and/or plasticizing additive and in which cement, additive and water are present according to a weight ratio variable from 1: 1/3; 1/3 to 1; 1/6; 1/6.

2. The method according to claim 1, wherein the maintaining of the deformable composite structure in the forming device comprises moving the forming device so as to obtain a predetermined configuration of the composite structure.

3. The method according to claim 1, further comprising removing the composite structure by the forming device, once solidified.

4. The method according to claim 1, wherein the maintaining of the composite deformable structure in association with the forming device, is performed for a predetermined time interval Δt.

5. The method according to claim 1, wherein the removing part of the fluid cementitious composition from the support element is accomplished by localized actions, by means of a jet of fluid incident on the first surface and/or on the second surface of the support element, during the association phase with the forming device.

* * * * *